(12) United States Patent
Wöhrle et al.

(10) Patent No.: US 9,520,583 B2
(45) Date of Patent: Dec. 13, 2016

(54) GALVANIC ELEMENT WITH ENHANCED SAFETY PROPERTIES

(71) Applicant: Robert Bosch GmbH, Stuttgart (DE)

(72) Inventors: Thomas Wöhrle, München (DE); Felix Eberle, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 14/158,562

(22) Filed: Jan. 17, 2014

(65) Prior Publication Data
US 2014/0205884 A1  Jul. 24, 2014

(30) Foreign Application Priority Data
Jan. 18, 2013  (DE) ..................... 10 2013 200 707

(51) Int. Cl.
*H01M 2/16* (2006.01)
*H01M 10/0525* (2010.01)

(52) U.S. Cl.
CPC ........... *H01M 2/1686* (2013.01); *H01M 2/162* (2013.01); *H01M 2/1646* (2013.01); *H01M 2/1626* (2013.01); *H01M 2/1653* (2013.01); *H01M 10/0525* (2013.01); *Y02T 10/7011* (2013.01)

(58) Field of Classification Search
CPC .. H01M 2/1686; H01M 2/1646; H01M 2/162; H01M 2/1653; H01M 2/1626; H01M 10/0525; H01M 10/0481; H01M 10/04; H01M 10/0431; H01M 2200/20; H01M 2/0262; H01M 2/0237; H01M 2/0245; H01M 2/02; H01M 2/0277; Y02E 60/122
See application file for complete search history.

(56) References Cited

U.S. PATENT DOCUMENTS

| 7,112,389 | B1 | 9/2006 | Arora et al. | |
| 2009/0029253 | A1* | 1/2009 | Itou et al. | 429/223 |
| 2009/0291360 | A1* | 11/2009 | Kim et al. | 429/145 |
| 2010/0196688 | A1* | 8/2010 | Kritzer et al. | 428/220 |

FOREIGN PATENT DOCUMENTS

| DE | 10 2009 002 689 A1 | 11/2010 |
| DE | 10 2010 030 197 A1 | 12/2011 |

* cited by examiner

*Primary Examiner* — Patrick Ryan
*Assistant Examiner* — Aaron Greso
(74) *Attorney, Agent, or Firm* — Maginot, Moore & Beck LLP

(57) ABSTRACT

A galvanic element includes at least one lithium-intercalating and at least one lithium-deintercalating electrode. A positive electrode and a negative electrode are separated by a polyimide-based separator that has a labyrinth porosity. The polyimide-based separator is configured at least on one side with a porous, ceramically-based coating that comprises a binder and ceramic particles.

15 Claims, 2 Drawing Sheets

GALVANIC ELEMENT WITH ENHANCED SAFETY PROPERTIES

This application claims priority under 35 U.S.C. §119 to patent application no. DE 10 2013 200 707.8 filed on Jan. 18, 2013 in Germany, the disclosure of which is incorporated herein by reference in its entirety.

BACKGROUND

Currently deployed across a broad utility spectrum in battery engineering is the lithium ion technology. Notable features of this technology include its high energy density and its extremely low inherent self-discharge. Lithium ion cells possess at least one positive electrode (cathode) and a negative electrode (anode), which are capable of reversible insertion—known as intercalation—or removal—known as deintercalation—of lithium ions.

Lithium ion cells are generally packed in composite aluminum foils or possess a hard metallic housing. On account of the pliant packaging, battery cells are also referred to as pouches or soft packs. Housings for cells with a hard, purely metallic housing are also referred to as hardcases.

For intercalation of lithium ions and/or deintercalation of lithium ions to take place at all, the presence is required of a lithium ion conductive salt. For the majority of contemporary lithium ion cells, both in the consumer sector (mobile telephone, MP3 player, etc.) and in the automotive sector—HEV (Hybrid Electric Vehicle), PHEV (Plug-in Hybrid Electric Vehicle), EV (Electric Vehicle)—the lithium conductive salt used with preference is lithium hexafluorophosphate ($LIPF_6$). The $Li^+$ ions migrate back and forth through a porous separator between the electrodes during the charging operation and during the discharge operation of the lithium ion cell.

On account of the high specific energy and volumetric energy density of the lithium ion cells, cell materials employed in these cells are required to have a high level of intrinsic safety and also a safe cell design. This is ensured by means including a separator which separates the negative electrode from the positive electrode and itself constitutes an electrical insulator.

In the lithium ion technology in accordance with the prior art it is possible in lithium ion cells to use porous polyolefin separators. Polyolefin separators designed with this kind of porosity may be polyethylene (PE) or polypropylene (PP) based. Specifically with polyethylene, and also, moreover, with polypropylene, temperatures in the region of the softening point of the polymer are accompanied by contraction around the sides of the polyolefin separator. The term "shrinking" is also used. Other separators used, made of plastic which is high-melting, are known from U.S. Pat. No. 7,112,389 B1 and are more stable both thermally and mechanically than polyolefin-based separators. In high-capacity automotive cells with a capacity of around 20 to 90 Ah, even the polyimide-based separators from U.S. Pat. No. 7,112,389 B1, which have improved properties in contrast to polyolefin separators, often lack sufficient intrinsic safety, particularly under mechanically and thermally induced loads and also under electrical stress such as overcharging, for example.

An alternative route is taken in the solution according to DE 10 2009 002689 A1. This solution discloses the production and use of ceramic composite materials based on polymer support sheet. Here, a composite is used which is composed of a porous ceramic layer and a porous plastics film, in order to constitute a separator. As a plastics membrane of porous design, this solution uses a perforated sheet having a regular arrangement of holes. A configuration of this kind with an open porosity, however, carries the disadvantage that during the charging operation of the cell, particularly in the case of a high charge state in a constant voltage recharge, it is possible for lithium dendrites to form, which might lead to internal cell shortcircuits and initiate safety-critical events.

SUMMARY

Proposed in accordance with the disclosure is a galvanic element having at least one lithium-intercalating and at least one lithium-deintercalating electrode, the positive and negative electrodes being separated by a polyimide-based separator formed from a polyimide exhibiting porosity, the polyimide-based separator being provided at least on one of its sides with a composite coating comprising at least one binder and also ceramic particles.

In accordance with the disclosure, the porosity of the separator takes the form of labyrinth porosity. This means that the separator has a number of labyrinthine channels which represent, so to speak, culs-de-sac, which do not extend continuously from one side of the separator to its other side. As a result of the labyrinth porosity, there is no direct communication between the two side faces of the separator. The labyrinth porosity, accordingly, is a porosity which does not have a regular pattern and in particular does not have any open channels or regions through which the two sides of the separator, which acts as insulator, enter directly into communication with one another. The architecture of the separator in a labyrinth porosity, as proposed in accordance with the disclosure, makes it possible more particularly to prevent the growth of lithium dendrites between the two electrodes through open channels in the separator. This through growth of lithium dendrites is ruled out by the cul-de-sac nature of the individual labyrinth channels of the labyrinth porosity and by the absence of short circuiting between the two separator sides.

The porous, ceramic-based coating which is applied on at least one side of the polyimide-based separator also stabilizes the polyimide-based separator with respect to thermal and mechanical loads. A wetting fluid contemplated as liquid electrolyte for the polyimide-based separator in the cell is, for example, a one-molar solution of lithium hexafluorophosphate, $LiPF_6$, in a mixture of organic solvents such as ethylene carbonate (EC), propylene carbonate (PC), ethyl methyl carbonate (EMC), diethyl carbonate (DEC), symmetrical or asymmetrical ethers. Liquid components of this kind ensure that the polyimide-based separator proposed in accordance with the disclosure, comprising the ceramic-based coating comprising a binder and ceramic particles, and also the polyimide-based separator body itself, are sufficiently wetted. This liquid fills the porosity of the porous coating and also of a polyimide-based membrane to a sufficient degree.

The porous, ceramically based coating may comprise, for example, aluminum oxide ($Al_2O_3$), titanium dioxide ($TiO_2$) or silicon dioxide $SiO_2$. Use may also be made of a ceramic which is itself a lithium ion conductor, as for example $Li_{0.34}La_{0.51}TiO_{2.94}$. A lithium ion-conducting ceramic advantageously increases the high-current capability of the galvanic element as compared with one which has a porous, ceramically based coating without intrinsic lithium ion conductivity, such as $Al_2O_3$, for example; in this regard, compare also prior art according to DE 10 2010 030 197 A1.

In advantageous development of the concept proposed in accordance with the disclosure, besides the aforementioned oxides, consideration is also given to ceramics such as, for example, $Li_{1.5}Al_{0.5}Ge_{1.5}(PO_4)_3$ (LAPG) phosphates, sulfides and titanates. Furthermore, as far as the selection of the ceramics is concerned, recourse may be had to the following groups of compounds:

$Li_9AlSiO_8$, $Li_7SiPO_8$, $LiAlCl_4LiL*(Al_2O_3)$, $LiI*4CH_3OH$, $Li0.34La_{0.51}TiO_{2.94}$, $0.5LiTaO_3$—$0.5SrTiO_3$, $Li_{1.3}Al_{0.3}Ti_{1.7}(PO_4)_3$, $0.01Li_3PO_4 \cdot 0.63Li_2S \cdot 0.36SiS_2$ The porous, ceramically based coating is advantageously provided with a binder, which may be fluorinated. Fluorinated polymers used as electrodebinders are, for example, polyvinylidene fluoride PVdF or polyvinylidene fluoride-hexafluoropropylene (PVdF-HFP) or polytetra-fluoroethylene PTFE. The binders may also, however, be formed by polystyrene-butadiene or cellulose-based.

As far as the geometry of the polyimide-based separator is concerned, the separator has a thickness which may be in the range between 5 μm to 50 μm, preferably between 10 μm and 30 μm, more preferably between 15 and 25 μm. The porous, ceramically based coating may be applied on one of the on both sides of the separator, in each case facing the electrodes. The thickness of the porous, ceramic-based coating is in the range between 1 μm-20 μm, preferably between 2 μm and 6 μm.

A feature of the solution proposed in accordance with the disclosure is that the polyimide-based separator proposed in accordance with the disclosure and the lithium ion cell proposed in accordance with the disclosure that is equipped with this separator exhibit a substantially higher safety level as compared with conventional lithium ion cells. The latter cells comprise either only polyolefin-based separators or else very high-melting polyimide-based separators of the kind known from U.S. Pat. No. 7,112,389 B1, for example.

At the temperatures at which the "shrinking" frequently observed with polyolefin separators occurs, the polyimide-based separator proposed in accordance with the disclosure still has utmost thermal and mechanical stability and does not exhibit changes in geometry of whatever kind, even at high operating temperatures or in other thermal stress situations.

The polyimide-based separator proposed in accordance with the disclosure may be manufactured extremely inexpensively from commercial polyimide separators, by providing such polyimide-based separators on one or both sides with the porous, ceramic-based coating. The combination of a chemically, electrochemically and mechanically stable, polyimide-based separator exhibiting an angular labyrinth porosity with the porous, ceramic-based coating displays a very high degree of intrinsic safety.

Coating of the ceramic protective layer may take place at the premises of the battery cell manufacturer. The coating may be performed, for example, by spraying or by coating with a slot die or with an engraved roll. Polyimide specifically has a high surface tension and can be wetted much more effectively as compared with polyolefins, which possess a very low surface tension. A further result of this is improved adhesion of the ceramic protective layer to the material of the separator.

BRIEF DESCRIPTION OF THE DRAWINGS

The disclosure is described in more detail close by with reference to the drawings.

DETAILED DESCRIPTION

Figure 1:
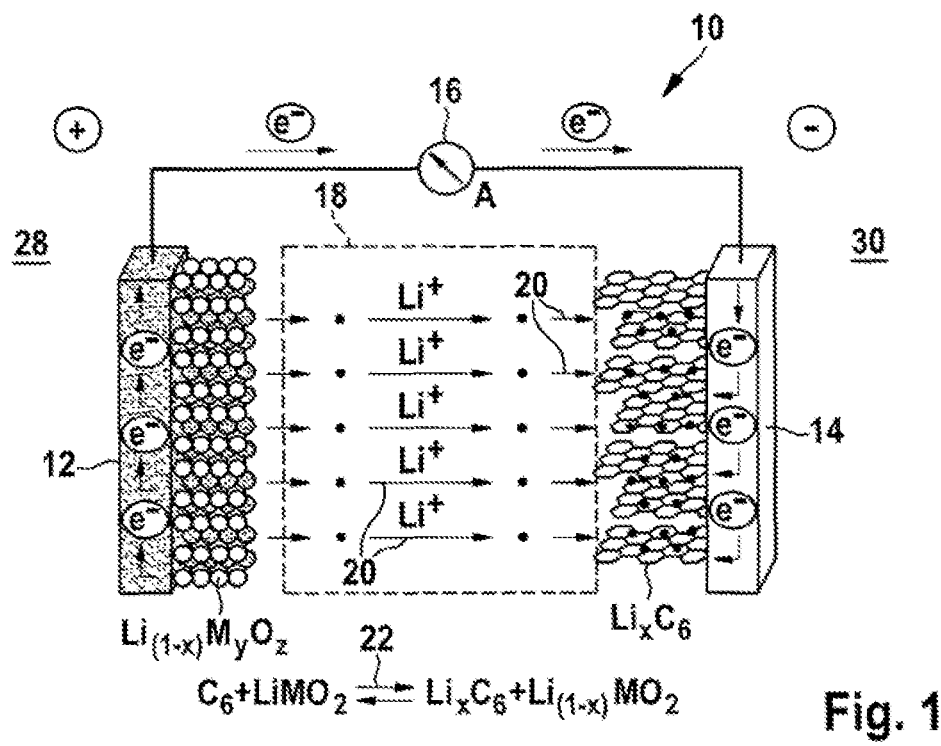
FIG. 1 shows the migrational direction of Li+ions during the charge operation, from the positive electrode to the negative electrode.

The representation according to FIG. 1 gives a closer indication of the migrational direction of $Li^+$ ions during the charging of a galvanic element 10. A galvanic element 10, the components of which are indicated only schematically in FIG. 1, comprises a positive electrode 12 (cathode) and an opposing negative electrode 14 (anode). A current flowing through between the two electrodes 12 and 14, which are separated from one another, can be measured by means of an ammeter 16. Located between the two electrodes 12 and 14, which are separate from one another, is a lithium ion-conducting electrolyte 18. This electrolyte 18 is generally a liquid electrolyte, as for example a 1-molar solution of lithium hexafluorophosphate $LiPF_6$ in a mixture of organic solvents. The organic solvents may be, for example, ethylene carbonate (EC), propylene carbonate (PC), ethyl methyl carbonate (EMC), diethyl carbonate (DEC), or symmetrical or asymmetrical ethers. This liquid electrolyte ensures wetting of a polyimide-based separator, described later on below in context in FIG. 3.

In FIG. 1, a migrational direction of the $Li^+$ ions during charging is indicated by reference symbols 20.

The reaction equation

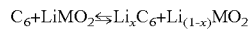

$$C_6+LiMO_2 \leftrightarrows Li_xC_6+Li_{(1-x)}MO_2$$

proceeds in the direction of the upper arrow during charging, i.e., from left to right. M here is for a transition metal such as cobalt (Co), nickel (Ni) or manganese (Mn), for example.

A positive side of the galvanic element 10 is labeled, in the representation according to FIG. 1, by reference symbol 28, while a negative side is identified by reference symbol 30.

Figure 2:
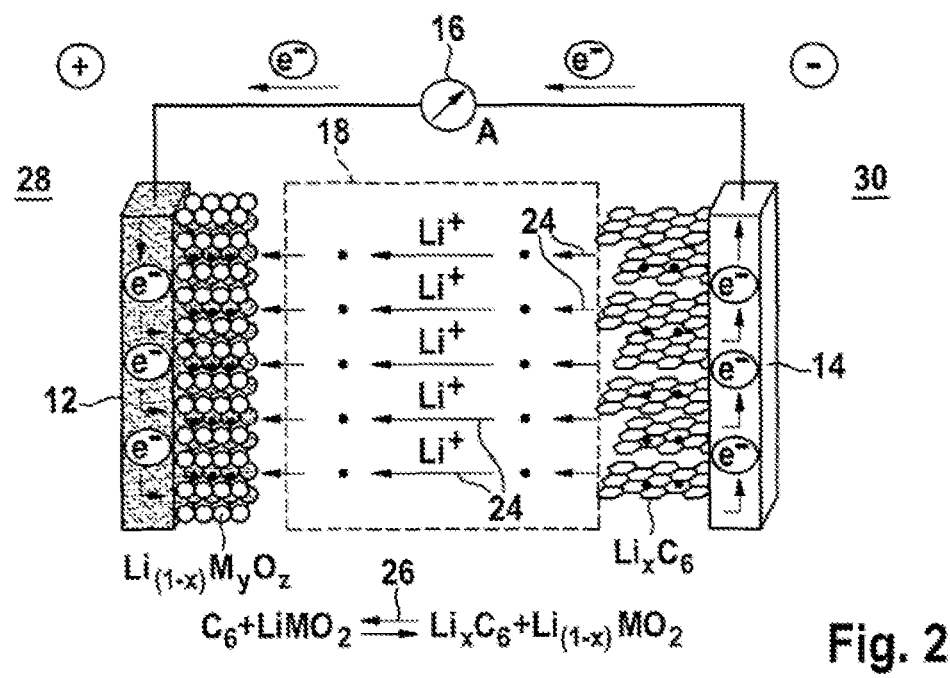
FIG. 2 shows the migrational movement of the $Li^+$ ions during the discharge operation, from the negative electrode to the positive electrode.

Apparent from the representation according to FIG. 2 is the discharging of an $Li^+$ ion cell of a galvanic element 10, with the $Li^+$ ions migrating, in opposition to the migrational direction according to the depiction in FIG. 1, from the negative electrode 14 (anode) to the positive electrode 12 (cathode) of the galvanic element 10. The construction of the galvanic element 10 according to the depiction in FIG. 2 is analogous to the construction of the galvanic element 10 according to the depiction in FIG. 1. FIG. 2 depicts a discharging operation 26, during which the $Li^+$ ions migrate from the negative electrode 14 to the positive electrode 12 (cathode) through the liquid electrolyte 18. The positive electrode 12 (cathode) may be made of aluminum, for example, while the negative electrode 14 (anode) of the galvanic element 10 may be made of copper.

The reaction equation:

$$C_6+LiMO_2 \leftrightarrows Li_xC_6+Li_{(1-x)}MO_2$$

proceeds in the direction opposite to that in FIG. 1, i.e., from left to right, in accordance with the bottom of the two arrows in the reaction equation.

The representation according to FIGS. 1 and 2 serves for depiction of the reversible insertion/removal, the intercalation and deintercalation of the Li⁺ ions.

Figure 3:
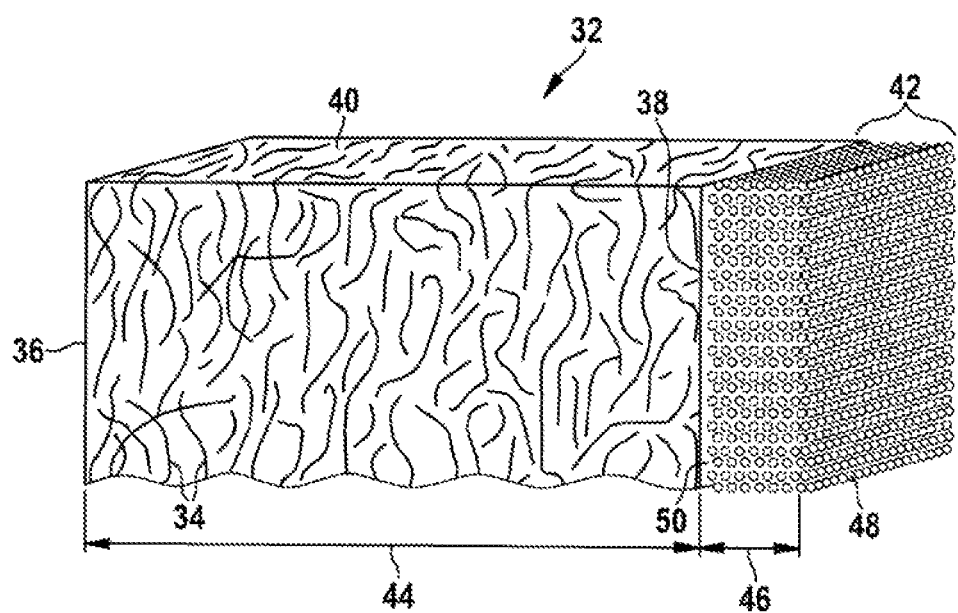
FIG. 3 shows the view of the polyimide-based separator with labyrinthine channels.

FIG. 3 shows, schematically, a polyimide-based separator with ceramic protective layer, the polyimide-based separator separating the electrodes of a galvanic element 10.

Apparent from the depiction according to FIG. 3 is a separator 32. The separator 32 is a polyimide-based separator having a labyrinth porosity 34—i.e. no open porosity. The labyrinth porosity 34 is characterized by an irregular pattern of labyrinthine labyrinth channels, representing culs-de-sac, which end in the interior of the polyimide-based separator 32. As a result there is no direct, continuous communication between the two side faces of the polyimide-based separator 32 acting as an insulator. The labyrinth porosity 34 comprises no direct communication channels between the two sides of the polyimide-based separator 32, and so the positive electrode 12 and the negative electrode 14 remain separate from one another. Since there are no continuous channels between the two sides of the polyimide-based separator 32, lithium dendrites occurring in the course of charging are unable to grow through the separator 32. Instead, the electrodes 12 and 14 remain effectively separate from one another. The polyimide-based separator 32 proposed in accordance with the disclosure and exhibiting labyrinth porosity 34 may be produced, for example, by a stretching operation, or extraction of filling materials, or by an arrangement of irregular fibers.

As a result of the polyimide-based separator 32 in accordance with the schematic representation in FIG. 3, the positive electrode 12 and the negative electrode 14 of the galvanic element 10 are separate from one another in accordance with the schematic representation in FIGS. 1 and 2. The polyimide-based separator 32 exhibiting the labyrinth porosity 34 is wetted by the Li⁺ ions conducting liquid electrolyte 18. The liquid electrolyte 18 used is, for example, a 1-molar solution of lithium hexafluorophosphate ($LiPF_6$) in a mixture of organic solvents such as ethyl carbonate (EC), propylene carbonate (PC) and ethyl methyl carbonate (EMC), diethyl carbonate (DEC), symmetrical or asymmetrical ethers. The liquid electrolyte 18 wets the polyimide-based separator 32 or an alternatively employable polyimide membrane to a sufficient degree.

The polyimide-based separator 32 depicted schematically in FIG. 3 has a first side 36 and a second side 38, and also a top face labeled with reference symbol 40. From FIG. 3 it is apparent that in the variant embodiment depicted therein, on the second side 38 of the polyimide-based separator 32, there is a coating 42 arranged which takes the form of a porous, ceramically based coating, comprises ceramic particles 48, which are embedded in a binder 50.

The binder 50 may be a fluorinated binder (e.g., polyvinylidene fluoride PVdF or polytetrafluoroethylene PTFE). A further possibility is to make the binder 50 a binder comprising polystyrene-butadiene, or to use a cellulose-based binder 50. The ceramic particles 48 which are embedded in the binder 50 of the ceramically based coating 42 may be oxides, as for example aluminum oxide $Al_2O_3$, titanium dioxide $TiO_2$ or silicon dioxide $SiO_2$. A further possibility, besides the stated oxides, is also to use ceramics of the $Li_{1.5}Al_{0.5}Ge_{1.5}(PO_4)_3$ (LAGB), phosphates sulfides and titanates. A further possibility is to select the ceramic particles 48 of the ceramic material from the following group:

$Li_9AlSiO_8$, $Li_7SiPO_8$, $LiAlCl_4LiL*(Al_2O_3)$, $LiI*4CH_3OH$, $Li0.34La_{0.51}TiO_{2.94}$, $0.5LiTaO_3$—$0.5SrTiO_3$, $Li_{1.3}Al_{0.3}Ti_{1.7}(PO_4)_3$, $0.01Li_3PO_4$-$0.63Li_2S$-$0.36SiS_2$

A lithium ion-conducting ceramic raises the high-current capability of the galvanic element 10 by comparison with a ceramic without inherent lithium ion conductivity, such as $Al_2O_3$, for example.

Identified further in FIG. 3 by reference symbol 44 is a separator thickness in which the polyimide-based separator 32 may be designed. The separator thickness 44 is between 5 µm and 50 µm, with a range between 10 µm and 30 µm being preferred. The porous, ceramic-based coating 42 may be applied to only one of the two sides 36 and 38, or to both sides 36 and 38. A coating thickness 46 in which the porous, ceramic-based coating 42 is designed is within the order of magnitude between 1 µm and 20 µm, with a coating thickness 46 between 2 µm and 6 µm being preferred.

In one exemplary embodiment of the polyimide-based separator 32 in accordance with the depiction in FIG. 3, thin, porous, ceramic-based coatings 42, comprising ceramic particles 48 and binder 50, are applied to the polyimide-based separator 32. In a variant A, 5 µm of aluminum oxide $Al_2O_3$ are applied on both sides, i.e., on the first side 36 and also on the second side 38, to a polyimide-based separator 32 which is 22 µm wide; in a variant B, porous, ceramic-based coatings 42 each 5 µm thick and composed of silicon dioxide $SiO_2$ are applied on both sides, i.e., on the first side 36 and on the second side 38 of the polyimide-based separator 32, which is designed in a separator thickness 44 of 25 µm. This produces the polyimide-based separator 32 proposed in accordance with the disclosure. In a further possible embodiment (1st reference), 10 lithium ion cells in each case, i.e. galvanic elements 10, are made up with a polyimide-based separator 32 which is 35 µm thick. The positive electrode 12 comprises as active material a 50:50 mixture of lithium cobalt oxide $LiCoO_2$ and lithium nickel cobalt manganese oxide ($LiNi_{0.33}Co_{0.33}Mn_{0.33}O_2$), the negative electrode 14 comprising synthetic graphite (MCMB 6-28) as active material. The nominal capacity of the galvanic cell is 20 Ah; the 100% state of charge (SOC) of the galvanic element 10 is 4.20 volts.

In a further possible embodiment (2nd reference), a polyimide-based separator 32 in accordance with variant B above is employed. Ten galvanic elements 10 in each case are made up with the polyimide-based separator 32, which has a separator thickness 44 of 35 µm. The positive electrode 12 comprises as active material a 50:50 mixture of lithium cobalt oxide $LiCoO_2$ and lithium nickel cobalt manganese oxide ($LiNi_{0.33}Co_{0.33}Mn_{0.33}O_2$), and the negative electrode 14 comprises synthetic graphite (MCMB 6-28). The nominal capacity of the galvanic element 10 according to variant B is 20 Ah. Here as well, the 100% state of charge (SOC) is 4.20 volts.

While reference 1 and reference 2 made-up cells made up in this way are subjected to a nail penetration test, to be carried out in accordance with test specification at 100% SOC and having taken place with a nail having a diameter of 3 mm, with a penetration velocity of 18 m/s, the results are as follows:

| Lithium ion cell variant | SOC in % | Number of EUCARLEVEL 3 cells (electrolyte mass loss <50%) | Number of EUCARLEVEL 4 cells (electrolyte mass loss >50%) | Number of EUCARLEVEL 5 cells (fire or flaming) |
|---|---|---|---|---|
| 1.) | 100 | eight | one | one |
| 2.) | 100 | ten | zero | zero |

What is claimed is:

1. A galvanic element, comprising:
   at least one lithium-intercalating electrode and at least one lithium-deintercalating electrode; and
   a polyimide-based separator separating the electrodes, the polyimide-based separator having a labyrinth porosity and being configured at least on one side with an outermost coating including a binder and ceramic particles.

2. The galvanic element according to claim 1, wherein the coating comprises ceramic particles composed of inorganic, nonmetallic substances.

3. The galvanic element according to claim 1, wherein the ceramic particles of the coating are selected from the group consisting of the following ceramics: $Li_{1.5}Al_{0.5}Ge_{1.5}(PO_4)_3$, phosphate, sulfides, titanates.

4. The galvanic element according to claim 1, wherein the ceramic particles of the coating are selected from the group consisting of the following compounds: $Li_9AlSiO_8$, $Li_7SiPO_8$, $LiAlCl_4$, $LiL(Al_2O_3)$, $LiI*4CH_3OH$, $Li0.34La_{0.51}TiO_{2.94}$, $0.5LiTaO_3$—$0.5SrTiO_3$, $Li_{1.3}Al_{0.3}Ti_{1.7}(PO_4)_3$, $0.01Li_3PO_4$_$0.63Li_2S$-$0.36SiS_2$.

5. The galvanic element according to claim 1, wherein the coating comprises a polymeric binder that is fluorinated.

6. The galvanic element according to claim 5, wherein the binder comprises polyvinylidene fluoride, polyvinylidene-hexafluoropropylene, or polytetra-fluoroethylene.

7. The galvanic element according to claim 5, wherein the binder of the coating takes the form of copolymers based on styrene-butadiene or cellulose-based.

8. The galvanic element according to claim 1, wherein a separator thickness of the polyimide-based separator is in the range between 5 μm to 50 μm.

9. The galvanic element according to claim 1, wherein the coating is applied on one or both sides of the polyimide-based separator.

10. The galvanic element according to claim 1, wherein a coating thickness of the coating is between 1 μm to 20 μm.

11. The galvanic element according to claim 1, wherein the galvanic element is used in a lithium ion cell, a lithium ion module, a lithium ion pack, or a lithium ion battery.

12. The galvanic element according to claim 1, wherein the galvanic element is packaged in a composite aluminum foil.

13. The galvanic element according to claim 1, wherein the galvanic element is packaged in a solid metallic housing.

14. The galvanic element according to claim 8, wherein the separator thickness of the polyimide-based separator is in the range between 10 μm and 30 μm.

15. The galvanic element according to claim 10, wherein the coating thickness of the coating is between 2 μm and 6 μm.

* * * * *